United States Patent
Ueda et al.

(10) Patent No.: US 9,103,706 B2
(45) Date of Patent: Aug. 11, 2015

(54) FLOW MEASUREMENT STRUCTURE AND FLOW MEASUREMENT DEVICE

(75) Inventors: Naotsugu Ueda, Kusatsu (JP); Katsuyuki Yamamoto, Kusatsu (JP); Satoshi Nozoe, Shinagawa (JP); Shuji Maeda, Otsu (JP); Yuji Tsukuma, Hirakata (JP)

(73) Assignee: OMRON Corporation, Kyoto (JP)

( * ) Notice: Subject to any disclaimer, the term of this patent is extended or adjusted under 35 U.S.C. 154(b) by 248 days.

(21) Appl. No.: 13/806,496

(22) PCT Filed: Jul. 4, 2011

(86) PCT No.: PCT/JP2011/065291
§ 371 (c)(1),
(2), (4) Date: Mar. 8, 2013

(87) PCT Pub. No.: WO2012/014632
PCT Pub. Date: Feb. 2, 2012

(65) Prior Publication Data
US 2013/0167630 A1    Jul. 4, 2013

(30) Foreign Application Priority Data
Jul. 26, 2010 (JP) .............................. JP2010-167416

(51) Int. Cl.
*G01F 1/28* (2006.01)
*G01F 1/00* (2006.01)
(Continued)

(52) U.S. Cl.
CPC .............. *G01F 1/00* (2013.01); *G01F 1/6842* (2013.01); *G01F 1/6845* (2013.01); *G01F 1/696* (2013.01); *G01F 5/00* (2013.01); *G01F 15/12* (2013.01); *G01F 15/14* (2013.01); *G01F 15/185* (2013.01)

(58) Field of Classification Search
CPC ........................................................ G01F 1/68
USPC ................ 73/204.26, 204.22, 204.23, 204.24
See application file for complete search history.

(56) References Cited

U.S. PATENT DOCUMENTS 4,418,568 A * 12/1983 Surman ........................ 73/202.5
6,655,207 B1   12/2003 Speldrich et al.
(Continued)

FOREIGN PATENT DOCUMENTS

DE         3636930 A1    5/1988
FR          74070 E     11/1960
(Continued)

OTHER PUBLICATIONS

CD-ROM of the specification and drawings annexed to the request of Japanese Utility Model Application No. 155898/1981(Laid-open No. 60228/1983) (Tokico, Ltd.), Apr. 23, 1983, specification, p. 4, line 11 to p. 6, line 12; fig. 2, 3.
(Continued)

*Primary Examiner* — Jewel V Thompson
(74) *Attorney, Agent, or Firm* — Nutter McClennen & Fish LLP; John J. Penny, Jr.

(57) ABSTRACT

The disclosed flow measurement structure used in a flow measurement device is provided with a conduit through which gas to be measured flows, and a diverter which diverts gas flowing through the conduit and conducts the diverted gas to a detection element for measuring the flow amount of said gas. An inlet of the diverter is provided in the periphery of the conduit. The conduit is provided with an inclined section which, provided upstream of the inlet, guides the gas towards the center of the conduit.

5 Claims, 18 Drawing Sheets

(51) Int. Cl.
*G01F 1/684* (2006.01)
*G01F 1/696* (2006.01)
*G01F 5/00* (2006.01)
*G01F 15/12* (2006.01)
*G01F 15/14* (2006.01)
*G01F 15/18* (2006.01)

(56) References Cited

U.S. PATENT DOCUMENTS

| | | | |
|---|---|---|---|
| 7,194,920 B2 * | 3/2007 | Welker | 73/861.65 |
| 7,313,954 B2 | 1/2008 | Kouno et al. | |
| 7,574,908 B2 | 8/2009 | Ueda et al. | |
| 8,756,989 B2 * | 6/2014 | Goka et al. | 73/204.26 |
| 2003/0094041 A1 | 5/2003 | Iwaki et al. | |
| 2003/0126925 A1 | 7/2003 | Roeckel et al. | |
| 2011/0146397 A1 | 6/2011 | Ueda et al. | |

FOREIGN PATENT DOCUMENTS

| | | |
|---|---|---|
| JP | 58-060228 U | 4/1983 |
| JP | 58-105013 A | 6/1983 |
| JP | 11-166720 A | 6/1999 |
| JP | 2000-205912 A | 7/2000 |
| JP | 2003-176740 A | 6/2003 |
| JP | 2003-523506 A | 8/2003 |
| JP | 2006-078487 A | 3/2006 |
| JP | 2006-308518 A | 11/2006 |
| JP | 2006-329927 A | 12/2006 |
| JP | 2009-287982 A | 12/2009 |
| JP | 2010-060287 A | 3/2010 |
| WO | 01/67049 A2 | 9/2001 |
| WO | 2005-005932 A1 | 1/2005 |
| WO | 2008/039115 A1 | 4/2008 |

OTHER PUBLICATIONS

International Search Report Application No. PCT/JP2011/065291, mailed Aug. 23, 2011.

Extended European Seach Report for corresponding EP Application No. 11812225.8, mailed May 16, 2014. (7 Pages).

Korean Office Action for Application No. 10-2012-7033187 issued Mar. 19, 2014 (3 Pages).

* cited by examiner

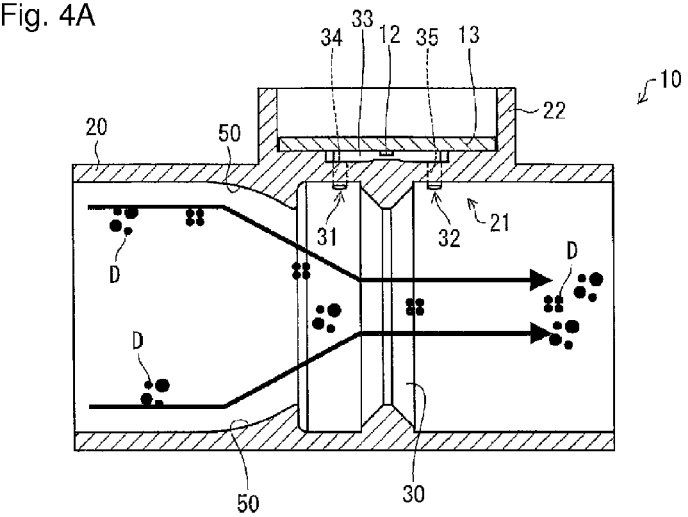
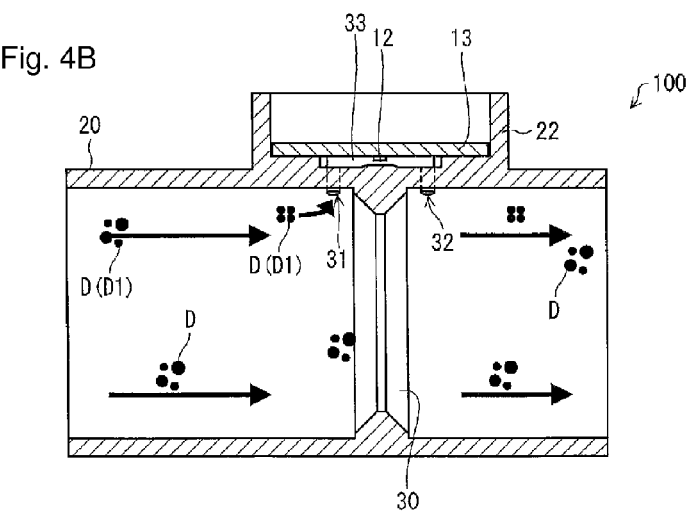

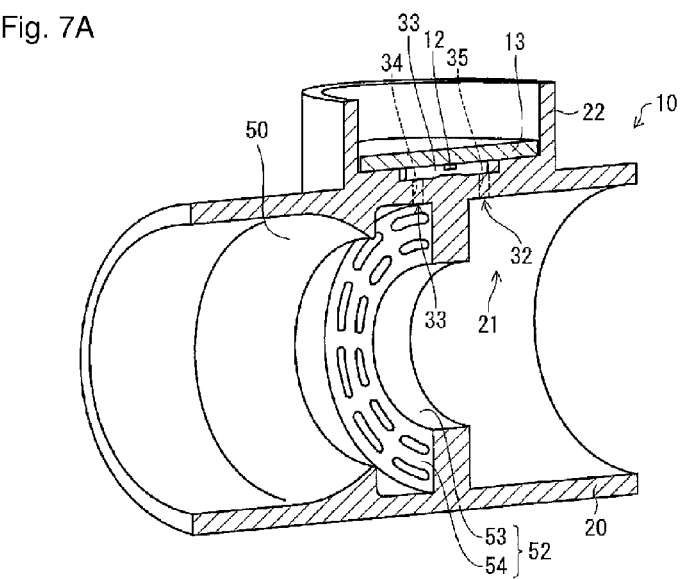
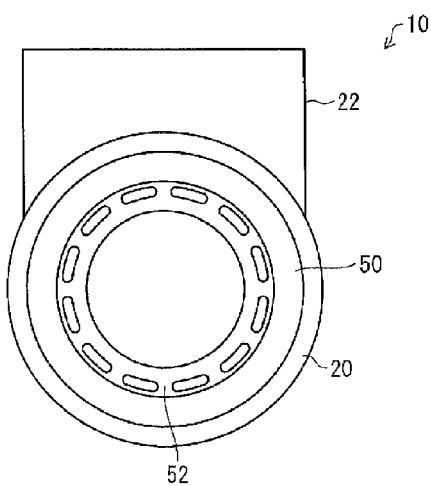

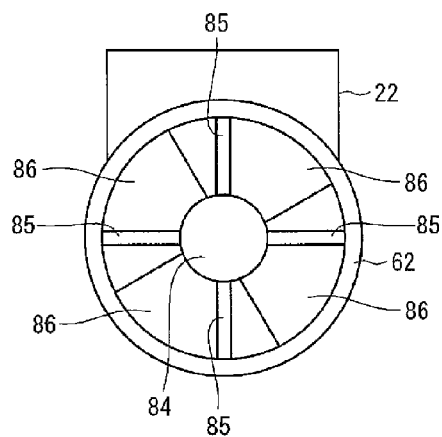
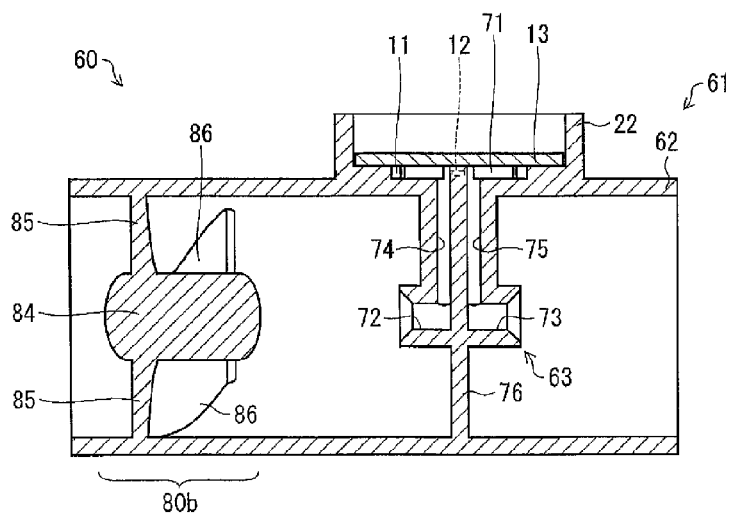

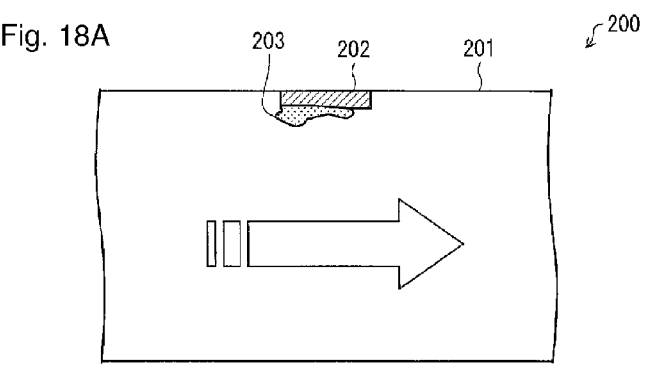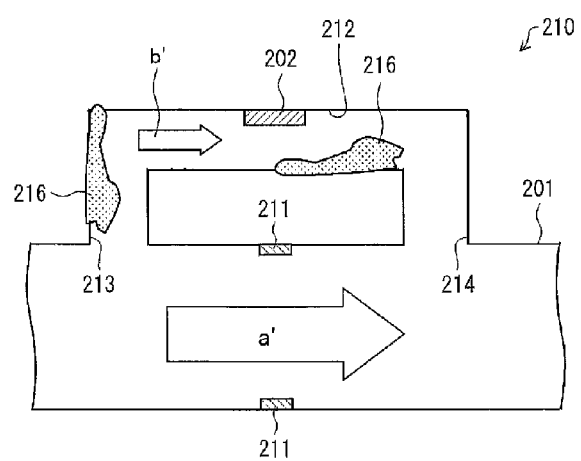

FLOW MEASUREMENT STRUCTURE AND FLOW MEASUREMENT DEVICE

TECHNICAL FIELD

The present invention relates to a flow measurement structure including a conduit through which fluid to be measured flows; and a diverter which diverts the fluid flowing through the conduit, and guides the diverted fluid to a detection element for measuring a flow rate of the fluid, and a flow measurement device using the flow measurement structure.

BACKGROUND ART

A flow measurement device is intended to measure a flow rate of fluid which is gas or liquid. Here, the flow rate is defined as an amount of fluid which moves through a given cross section in a unit time.

Generally, a flow measurement device is provided, at a flow path through which fluid to be measured flows, with a detection element for measuring a flow rate of the fluid, and measures the flow rate of fluid by using a detection signal from the detection element. Usage of the flow measurement device include, for example, measurement of a flow rate of gas which is used for combustion in a gas meter, a burning appliance, an internal combustion engine of an automobile and the like, measurement of flow rates of expiration and inspiration, and a flow rate of blood, in medical instruments, observation of a flow rate of air in industrial equipment, and observation of filter clogging in various equipment.

Generally, flow measurement devices are classified as a straight tube type and a diverting type in view of their structures. FIG. 17A illustrates a basic structure of a flow measurement device of straight tube type, and FIGS. 17B and 17C illustrates basic structures of a flow measurement device of diverting type.

As illustrated in FIG. 17A, a flow measurement device of straight tube type 200 has a structure in which a detection element 202 for measuring a flow rate of fluid is directly disposed at a conduit 201 through which the fluid to be measured flows. Generally, in the flow measurement device 200 of straight tube type, the flow velocity of the fluid needs to be lowered to a detectable range of the detection element 202. Therefore, the area of cross section in the conduit 201 needs to be enlarged so that the flow measurement device 200 is made to be enlarged.

Accordingly, when fluid of large flow rate is to be measured, a flow measurement device of diverting type is used. The flow measurement device of diverting type is configured to divert fluid to be measured, and measure a flow rate of the diverted fluid so as to estimate an entire flow rate (for example, refer to Patent Documents 1 to 5).

Specifically, in a flow measurement device 210 illustrated in FIG. 17B, a resistive element 211 for providing a suitable resistance to the flowing fluid is disposed in the conduit 201. Moreover, an inlet 213 and an outlet 214 of a diverter 212, through which a diversion of the fluid flows, are connected to the upstream side and the downstream side of the resistive element 212 respectively, at the peripheral section of the conduit 201. Then, the detection element 202 is disposed at the diverter 212. According to the above-mentioned constitution, the resistive element 211 provides a suitable resistance to the fluid, which flows through the conduit 201. With this, a part of the fluid is caused to flow into the inlet 213 of the diverter 212.

On the other hand, a flow measurement device 220 of diverting type illustrated in FIG. 17C is configured in such a way that a diverter 222, through which a diversion of the fluid flows, is disposed at the central section of the conduit 201, and the detection element 202 is disposed at this diverter 222. In this case, the diverter itself functions as a resistive element which disturbs the flow of fluid in the conduit 201 so that the fluid is made to flow into the diverter 222.

Patent Document 1: Japanese translation of PCT international application No. 2003-523506 (published on Aug. 5, 2003)
Patent Document 2: Japanese Unexamined Patent Publication No. 11-166720 (published on Jun. 22, 1999)
Patent Document 3: Japanese Unexamined Patent Publication No. 2006-329927 (published on Dec. 7, 2006)
Patent Document 4: Japanese Unexamined Patent Publication No. 2006-308518 (published on Nov. 9, 2006)
Patent Document 5: Japanese Unexamined Patent Publication No. 2010-060287 (published on Mar. 18, 2010)

SUMMARY

Generally, the conduit 201 often includes not only the fluid to be measured, but also dust. FIG. 18A illustrates a state in which dust 203 adheres to the detection element 202 in the flow measurement device 200 of straight tube type illustrated in FIG. 17A. In this case, the measurement accuracy of the detection element 202 is degraded. Note that, a similar problem occurs in the flow measurement devices 210, 220 which are illustrated in FIGS. 17B and 17C.

FIG. 18B illustrates a state in which dust 216 enters and adheres to the diverter 212 in the flow measurement device 210 of diverting type illustrated in FIG. 17B. In this case, the flow rate at the diverter 212 is lowered so that the ratio a:b (called as a diverting ratio hereinafter) of the flow rate a adjacent to the resistive element 211 at the conduit 201 and the flow rate b at the diverter 212 is made to be changed.

The flow measurement device 210 of diverting type is configured to measure the flow rate at the diverter 212, and estimate the flow rate of the fluid which flows into and out of the conduit 201 based on the measured flow rate and the diverting ratio a:b. Therefore, when the diverting ratio a:b is changed, the estimation accuracy of the flow rate of the fluid, which flows into and out of the conduit 201, is degraded. Furthermore, when the dust 216 is accumulated on the diverter 212 so that the above-mentioned fluid does not flow at the diverter 212, it becomes impossible to measure the above-mentioned flow rate. Note that, a similar problem occurs in the flow measurement device 220 of diverting type which is illustrated in FIG. 17C.

The present invention has been made taking into account the above-mentioned problem, and an object thereof is to provide a flow measurement structure and a flow measurement device of diverting type which can restrain dust from entering a diverter.

The flow measurement structure according to at least one embodiment of the present invention includes: a conduit through which fluid to be measured flows; and a diverter which diverts the fluid flowing through the conduit, and guides the diverted fluid to a detection element for measuring a flow rate of the fluid, wherein an inlet of the diverter is disposed at one of a central section and a peripheral section in the conduit, and wherein the conduit includes, upstream of the inlet, a guide section which guides the fluid to the other of the central section and the peripheral section, in order to solve the above problems.

According to the above-mentioned constitution, the guide section of the conduit is disposed upstream of the inlet of the diverter. Then, the inlet is disposed at the peripheral section in the conduit, the guide section guides the fluid toward the central section in the conduit. With this, the dust flowing in the conduit is guided toward the central section by the guide section so that the dust can be restrained from entering the diverter through the inlet which is disposed at the peripheral section.

On the other hand, when the inlet is disposed at the central section, the guide section guides the fluid toward the peripheral section. With this, the dust flowing in the conduit is guided toward the peripheral section by the guide section so that the dust can be restrained from entering the diverter through the inlet which is disposed at the central section.

As mentioned above, in the fluid measurement structure according to at least one embodiment of the present invention, the dust flowing in the conduit is guided by the guide section of the conduit, which is disposed upstream of the inlet of the diverter, toward a position which is apart from the position of the conduit so that an advantageous effect can be obtained, that is to restrain the dust from entering the diverter through the inlet.

BRIEF DESCRIPTION OF THE DRAWINGS

FIGS. 4A and 4B are cross-sectional views illustrating flow of dust in a conduit through which target gas flows, in the above-mentioned flow measurement device.

FIGS. 7A and 7B are schematic views illustrating another modified example of the above-mentioned flow measurement device.

FIGS. 13A and 13B are schematic views illustrating another modified example of the above-mentioned flow measurement device.

FIGS. 18A and 18B are cross-sectional views illustrating states in which dust adheres to the detection element and the diverter of the above-mentioned flow measurement devices.

MODE FOR CARRYING OUT THE INVENTION

First Embodiment

Figure 1:
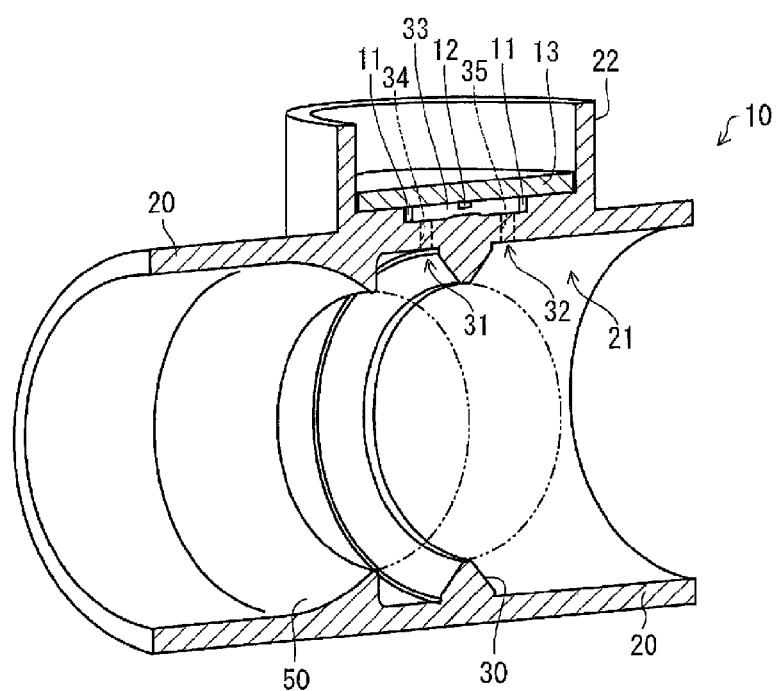
FIG. 1 is a partially cut out perspective view illustrating a flow measurement device according to an embodiment of the present invention.
Figure 2A:
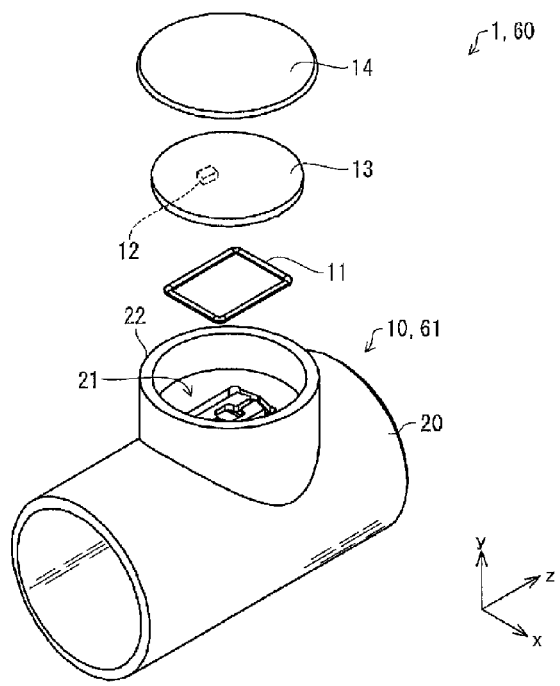
FIGS. 2A and 2B are schematic views of the above-mentioned flow measurement device.
Figure 2B:
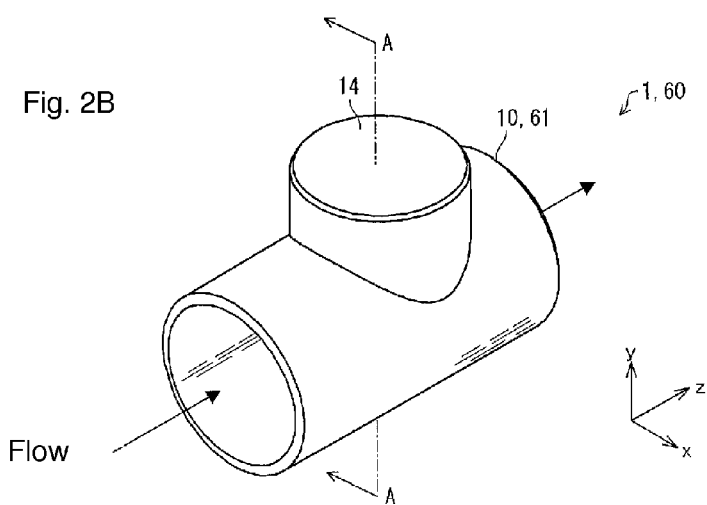

An embodiment of the present invention will be described with reference to FIGS. 1 to 8B. FIG. 1 and FIGS. 2A and 2B illustrate outlines of a flow measurement device 1 of the present embodiment. FIG. 2A is an exploded view, FIG. 2B is a perspective view, and FIG. 1 is a partially cut out perspective view.

A flow measurement device is configured to measure a flow rate of fluid which is gas or liquid, and the flow measurement device 1 of the present embodiment is a flow measurement device of diverting type which diverts fluid, and measures a flow rate of the diverted fluid so as to estimate an entire flow rate. Note that, in the following descriptions, the flow measurement device 1 will be described in the case where gas is to be measured, but this is not the only case, and liquid may be to be measured.

As a system for measuring the above-mentioned flow rate by the flow measurement device, a differential pressure system, an electromagnetic system, an area system, an ultrasonic system, an impeller system, a heat system, a Coriolis system, a capacity system, a swirl system, a turbine system, a Pitot tube system, and the like, can be cited. The flow measurement device 1 of the present embodiment is a mass flow measurement device of heat system, but this is not the only system, any system can be used as long as the system can be applied to a flow measurement device of diverting type.

As illustrated in FIG. 1 and FIGS. 2A and 2B, the flow measurement device 1 is configured to include a flow measurement structure 10, a seal member 11, a detection element 12, a circuit board 13, and a cover 14. Note that, the cover 14 is omitted in FIG. 1.

The flow measurement structure 10 is intended to measure a flow rate of gas to be measured (called as target gas hereunder), and is formed by a synthetic resin, and the like. Specifically, the flow measurement structure 10 is configured to include a conduit 20 in which the target gas flows, a diverter 21 for diverting the target gas, and detecting a flow rate of the gas which has been diverted (called as a diverted gas hereunder), the seal member 11 which is disposed above the diverter 21, a receiving section 22 which receives the detection element 12 and the circuit board 13. Note that, the details of the flow measurement structure 10 will be described later.

The detection element 12 is disposed at the diverter 21, and is intended to detect the flow rate of the diverted gas. Note that, the details of the detection element 12 will be described later. The detection element 12 is mounted on the lower surface of the circuit board 13, and various circuits are mounted on the upper surface thereof for measuring the flow rate of the target gas by using a detection signal from the detection element 12. The seal member 11 is intended to prevent the diverted gas from leaking through a gap between the flow measurement structure 10 and the circuit board 13, and is formed by an insulator, such as rubber. The cover 14 is intended to protect the circuit board 13, and is formed with a material, which is similar to that of the flow measurement structure 10, so as to cover the distal end of the receiving section 22.

Next, the details of the flow measurement structure 10 will be described. As illustrated in FIG. 1, a resistive element 30, which provides a suitable resistance to the flowing target gas, is disposed at the conduit 20. As a shape of the resistive element 30, there can be cited a shape for narrowing the flow of the target gas toward the center as illustrated in FIG. 1, a spoke shape, a lattice shape, and the like. Moreover, an inlet 31, where the target gas is diverted, and flows into the diverter 21, is formed, upstream of the resistive element 30, on the inner surface of the conduit 20, and an outlet 32, where the diverted fluid flows from the diverter 21 so as to be merged with the target gas, is formed downstream of the resistive element 30.

A detection chamber 33 in which the detection element 12 is disposed, and small tube sections 34, 35 which make the detection chamber 33 communicate with the inlet 31 and the outlet 33, are formed at the diverter 21. Note that, a plurality of inlets 31 and/or a plurality of outlets 32 can be formed. In this case, a plurality of small tube sections 34 and/or a plurality of small tube sections 35 are also formed.

In the flow measurement structure 10 of the above-mentioned constitution, the resistive element 30 provides a suitable resistance to the target gas which flows through the conduit 20. With this, a part of the target gas flows into the inlet 31, and as the above-mentioned diverted gas, enters the detection chamber 33 through the small tube 34, and is discharged from the outlet 32 through the small tube 35, so as to be merged with the target gas. Therefore, it can be understood that the diverting ratio a:b of the flow rate a of the gas which passes through the resistive element 30 and the flow rate b of the diverted fluid which passes through the diverter 21 is determined by the geometrical shape of the resistive element 30.

Figure 3A:
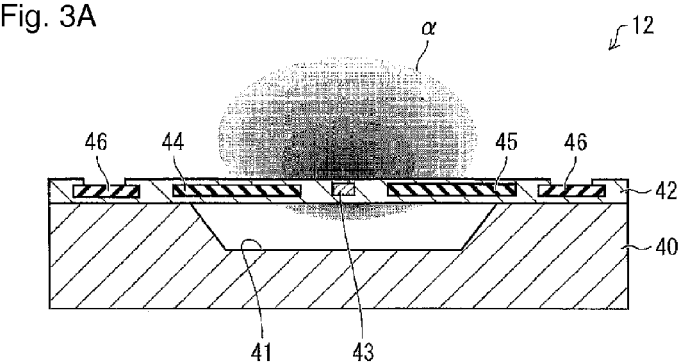
FIGS. 3A and 3B are cross-sectional views illustrating a detection principle of a detection element which is used in the above-mentioned flow measurement device.
Figure 3B:
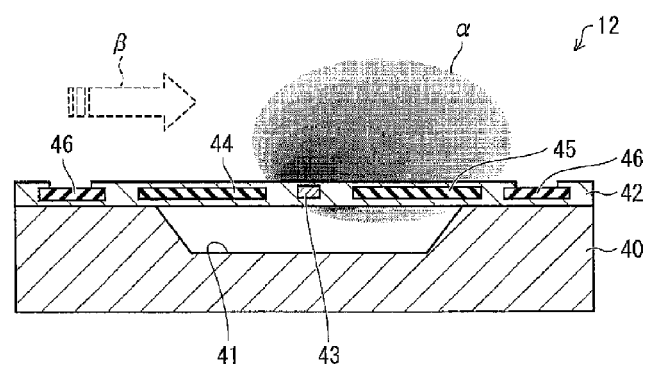

Here, the details of the detection element 12, which is disposed in the detection chamber 33 of the diverter 21, will be described. FIGS. 3A and 3B illustrate the detection principle of the detection element 12 which is used in the mass flow rate measurement device 1 of heat system of the present embodiment. FIG. 3A illustrates a state in which the diverted gas is not flowing, and FIG. 3B illustrates a state in which the diverted gas is flowing.

The detection element 12 of the present embodiment is a miniature flow sensor which is formed with a silicon wafer by using a micro electro mechanical system (MEMS) technology (called as MEMS flow sensor). Specifically, as illustrated in FIG. 3A, a cavity 41 is formed on the upper surface of a silicon substrate 40, and an insulation film 42 is formed so as to cover the cavity 41.

A heater 43 is formed at the central section of the insulation film 42 by polysilicon, and thermopiles 44, 45 are respectively formed upstream and downstream of the heater 43. The thermopiles 44, 45 are configured by alternatively connecting an Al line element and a polysilicon line element so as to be disposed in a zigzag arrangement. The thermopiles 44, 45 are symmetrically disposed with respect to the heater 43 so as to measure temperatures at the symmetrical positions on both sides of the heater 43.

A plurality of external connecting terminals 46 are formed at the peripheral section of the insulation film 42. Note that, although it is not shown, wiring is formed for electrically connecting the plurality of external connecting terminals 46 to the heater 43 and the thermopiles 44, 45, respectively. Then, the insulation film 42 is further formed on the heater 43, the thermopiles 44, 45, and the external connecting terminals 46, and a part of the external connecting terminals 46 is exposed by etching.

At the time of measuring the flow rate, the heater 43 is generating heat at a predetermined temperature, and a predetermined temperature distribution (temperature gradient) a is generated around the heater 43. The thermopiles 44, 45 are symmetrically disposed so that, when no flow of the diverted gas exists on the heater 43 as illustrated in FIG. 3A, the detected temperatures of both the thermopiles 44, 45 are the same, and the temperature difference becomes zero.

On the other hand, when a flow of the diverted gas occurs above the heater 43 as illustrated in FIG. 3B, the heat of the heater 43 is transported downstream by the flow of gas 13 so that the temperature distribution a is shifted downstream. With this, while the detected temperature at the downstream thermopile 45 is raised, the temperature at the upstream thermopile 44 is lowered, so that a temperature difference is made to occur between the detected temperatures of both the thermopiles 44, 45. This temperature difference is proportional to the mass flow rate of the diverted gas so that the mass flow rate of the diverted gas can be measured by detecting the temperature difference with the detection element 12. Then, the mass flow rate of the target gas can be estimated by using the measured mass flow rate of the diverted gas and the above-mentioned diverting ratio a:b.

Furthermore, the MEMS flow sensor, which is the detection element 12 of the present embodiment, has a micro structure, and hence has a small heat capacity, so that the measurement range is broader than those of other detection elements of heat system, and a measurement of gas having an extremely low flow velocity, which is conventionally difficult to be performed, can be performed. Moreover, the principle enables a bidirectional flow rate measurement, and an electric power consumption is so small that a battery drive can be available.

Referring back to FIG. 1, in the present embodiment, at the conduit 20 of the flow measurement structure 10, an inclined section (guide section) 50, which guides the target gas toward the central section, is disposed upstream of the inlet 31. FIGS. 4A and 4B illustrate a flow of dust D at the conduit, through which the target gas flows, in the flow measurement device. FIG. 4A illustrates the flow measurement device 1 of the present embodiment, and FIG. 4B illustrates a flow measurement device 100 as a comparative example. The flow measurement device 100 of the comparative example is configured by omitting the inclined section 50 from the flow measurement device 1 of the present embodiment.

Referring to FIG. 4B, when the inclined section 50 is omitted, there is no structure, other than the resistive element 30, which changes the direction of flow, and hence, it can be understood that the flowing direction of the dust D becomes the same as the direction of the central axis of the conduit 20, as shown by the arrows. Therefore, at the conduit 20, the dust D1, which exists in the direction opposite to the shown arrows from the inlet 31, is made to easily enter the inlet 31 so that the measurement accuracy of the flow measurement device 100 is made to be degraded.

On the other hand, referring to FIG. 4A, it can be understood that, when the inclined section 50 is disposed, the flowing direction of the dust D is directed toward the center of the conduit 20 by the inclined section 50 as illustrated by the arrows, and after passing through the inclined section 50, the flow of the dust D flows in said direction by an inertial force for a while. Then, after passing through the resistive element 30, the flow of the dust D becomes to flow in the same direction as that of the central axis of the conduit 20. Furthermore, at the inclined section 50, the flow velocity of the gas and the dust D is increased because the cross-sectional area in the conduit 20 is narrowed. Therefore, it can be understood that the dust D is restrained from entering the inlet 31 which is disposed on the inner surface of the conduit 20 between the inclined section 50 and the resistive element 30.

Figure 5:
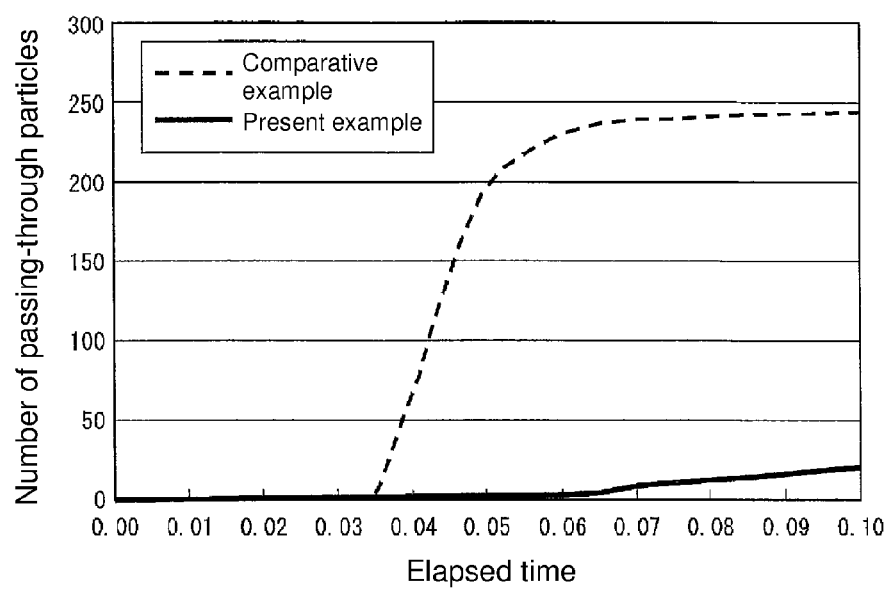
FIG. 5 is a graph illustrating simulation results of the above-mentioned flow measurement device and a flow measurement device as a comparative example.

FIG. 5 illustrates the results which are obtained by simulations of the amount of the dust D entering the diverter 21 in the flow measurement devices 1, 100 illustrated in FIGS. 4A and 4B by using fluid analysis software. In this simulation, the amount of the target gas, which enters the conduit 20, is set to 100 liter/min. Moreover, the dust D is defined as a particle which has a diameter of 0.1 µm, and a specific gravity of 3000 kg/m$^3$, and 1000000 particles are made to enter the conduit 20. Note that, it is devised that the diverting ratio a:b of the flow measurement device 1 of the present embodiment and the diverting ratio a:b of the flow measurement device 100 of the comparative example are made to correspond to each other.

In FIG. 5, the horizontal axis denotes the elapsed time, and the vertical axis denotes the number of the above-mentioned particles which pass through the detection chamber 33 in which the detection element 12 is disposed. Moreover, the solid line corresponds to the graph of the flow measurement device 1 of the present embodiment, and the broken line corresponds to the graph of the flow measurement device 100 of the comparative example. Referring to FIG. 5, it can be understood that, comparing to the flow measurement device 100 of the comparative example, the number of the above-mentioned particles, which pass through the detection chamber 33, in the flow measurement device 1 of the present embodiment, is less than or equal to one tenth, and the dust D is restrained from entering the diverter 21.

By the way, the piping of an actual equipment are repeatedly bent. The target gas is introduced into the conduit 20 of the flow measurement device 1 after passing through such piping so that the flow velocity distribution at the cross section of the conduit 20 becomes ununiform. The above-mentioned diverting ratio a:b is determined on the assumption that the above-mentioned flow velocity distribution is uniform, and hence, when the flow velocity near the inlet 31 is different from the average flow velocity, the diverting ratio becomes different so that the flow rate of the target gas cannot be estimated with accuracy.

On the other hand, in the present embodiment, the gas at the peripheral section in the conduit 20 is mixed with the gas at the central section by the inclined section 50 so that the above-mentioned flow velocity distribution can be uniformed. Therefore, the diverting ratio becomes the same so that the flow rate of the target gas can be estimated with accuracy.

Note that, in the present embodiment, as illustrated in FIG. 1, the inner diameter of the inclined section 50 is getting narrower from the upstream side to the downstream side, and sharply gets back to the inner diameter of the conduit 20 from the narrowest section. However, the inner diameter of the inclined section 50 may be gradually getting back to the inner diameter of the conduit 20.

Figure 6A:
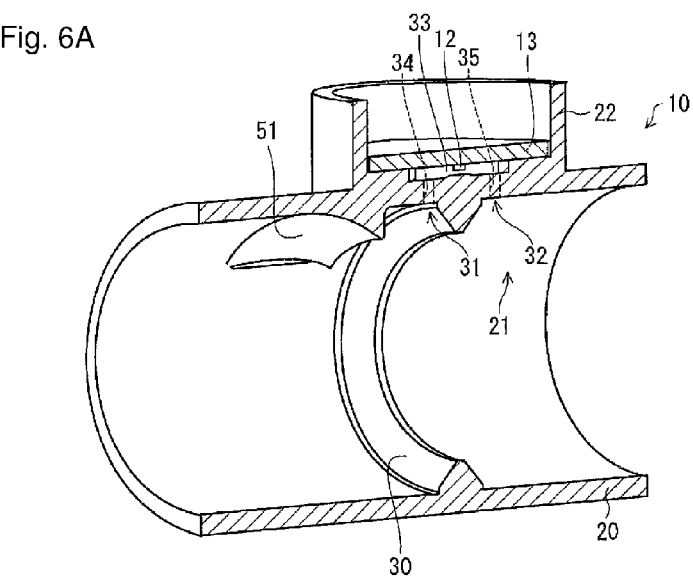
FIGS. 6A and 6B are schematic views illustrating a modified example of the above-mentioned flow measurement device.
Figure 6B:
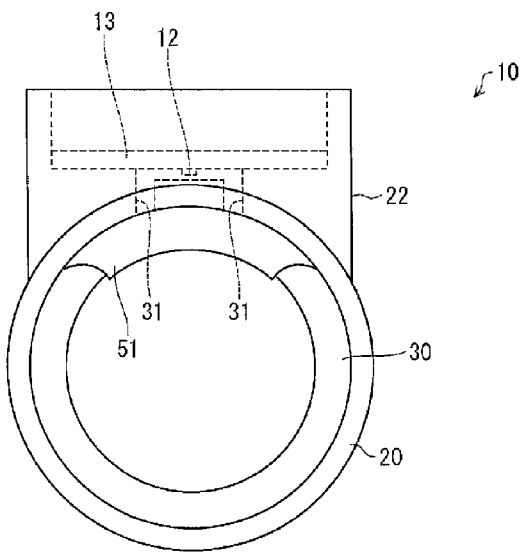

FIGS. 6A and 6B illustrate a modified example of the flow measurement device 1 of the present embodiment which is illustrated in FIG. 1. FIG. 6A is partially cut out perspective view, and FIG. 6B is a front view, namely, a diagram which is viewed from the direction in which the target gas flows. Comparing to the flow measurement device 1 illustrated in FIG. 1, the flow measurement device 1 illustrated in FIGS. 6A and 6B has a different structure about the inclined section, and other constitutions thereof are the same.

The inclined section 51 illustrated in FIGS. 6A and 6B has a structure in which the inclined section 50 illustrated in FIG. 1 is formed only at the section adjacent to the inlet 31. Also in this case, the dust D1 to enter the inlet 31 as illustrated in FIG. 4B can be moved toward the central section of the conduit 20 so that the dust D can be restrained from entering the inlet 31.

FIGS. 7A and 7B illustrate another modified example of the flow measurement device 1 of the present embodiment, and FIG. 7A is partially cut out perspective view, and FIG. 7B is a front view. Comparing to the flow measurement device 1 illustrated in FIG. 1, the flow measurement device 1 illustrated in FIGS. 7A and 7B has a different structure about the resistive element, and other constitutions thereof are the same.

A resistive element 52 illustrated in FIGS. 7A and 7B is opened at a central section 53, and multiple long holes are formed at a peripheral section 54 along double circumferences around the axis of the conduit 20. Like this, it is desired that the resistive elements 30, 52 used in these embodiments are opened at the central sections. In this case, the dust D, which has been moved toward the center of the conduit 20 by the inclined sections 50, 51, 55, can be smoothly moved downstream, as a result, the dust D is surely restrained from entering the inlet 31.

Figure 8A:
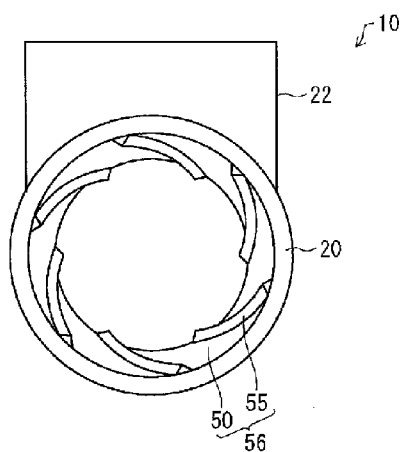
FIGS. 8A and 8B are schematic views illustrating still another modified example of the above-mentioned flow measurement device.
Figure 8B:
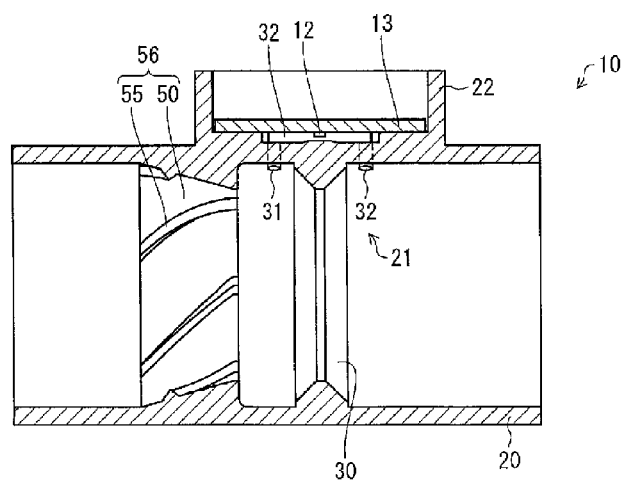

FIGS. 8A and 8B illustrate another modified example of the flow measurement device 1 of the present embodiment. FIG. 8A is a front view, and FIG. 8B is a diagram which is cut along the A-A line of FIG. 2B and is viewed in the arrow direction. Comparing to the flow measurement device 1 illustrated in FIG. 1, the flow measurement device 1 illustrated in FIGS. 8A and 8B has a different structure about the inclined section, and other constitutions thereof are the same.

The inclined section 55 illustrated in FIGS. 8A and 8B is configured by forming a plurality of spiral guide sections 56 at the inclined section 50 which is illustrated in FIG. 1. In this case, the gas at the peripheral section in the conduit 20 is mixed with the gas at the central section while being made to swirl by the inclined section 55 so that the above-mentioned flow velocity distribution can be further uniformed, and the dust D is prevented from being diffused toward the peripheral section of the conduit 20. Note that, the guide section 56 is formed as a convex portion, but it may be formed as a concave portion.

The target gas may flow in the opposite direction, namely, it can flow backward, through the conduit 20, the diverter 21, and the detection element 12. Then, the inclined sections 50, 51, 55 are added at positions which are symmetrical with respect to the resistive elements 30, 52, so that the above-mentioned advantageous effects can be obtained even when the target gas flows backward. Namely, the present invention can be applied to a flow measurement device which can measure a flow rate of fluid in two-way directions.

Second Embodiment

Figure 9:
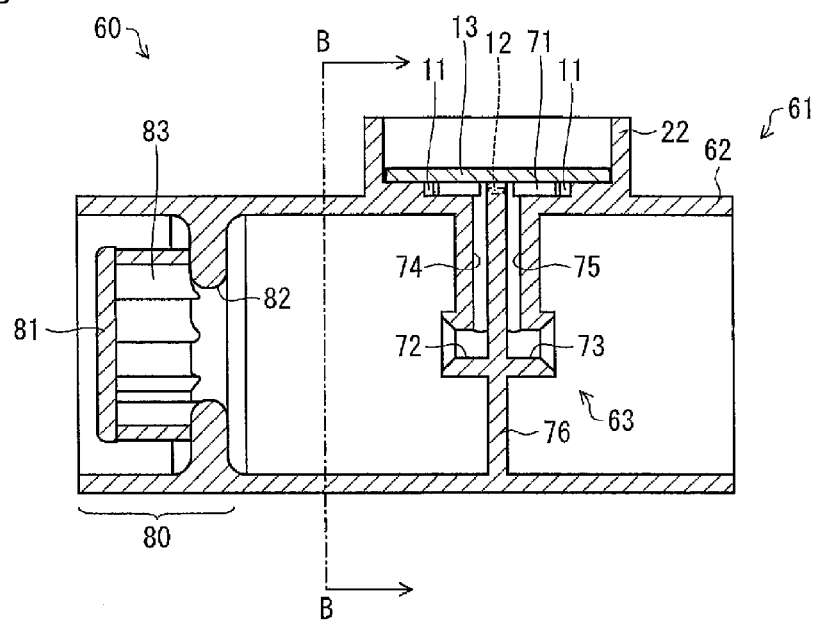
FIG. 9 is a cross-sectional view illustrating a schematic constitution of a flow measurement device as another embodiment of the present invention.
Figure 10A:
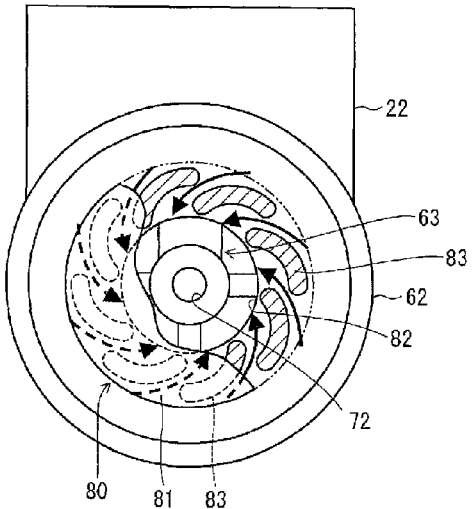
FIGS. 10A and 10B are schematic views of the above-mentioned flow measurement device.
Figure 10B:
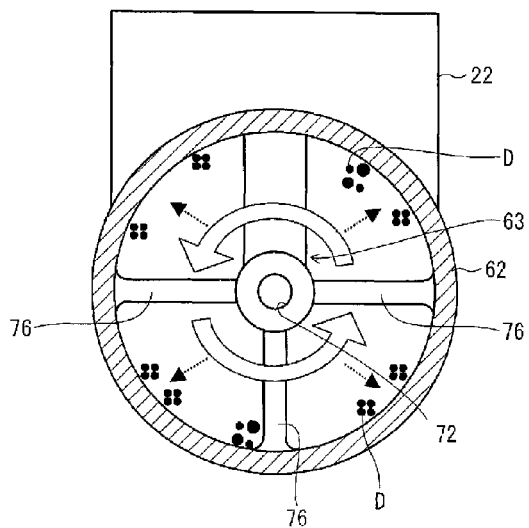

Next, another embodiment of the present invention will be described with reference to FIGS. 9 to 16B. FIG. 9 and FIGS. 10A and 10B illustrate a schematic constitution of a flow measurement device 60 of the present embodiment. FIG. 9 is a diagram which is cut along the A-A line of FIG. 2B and is viewed in the arrow direction, FIG. 10A is a partially cut out front view, and FIG. 10B is a diagram which is cut along the B-B line of FIG. 9 and is viewed in the arrow direction.

Comparing to the flow measurement device 1 illustrated in FIG. 1 and FIGS. 2A and 2B, the flow measurement device 60 of the present embodiment has different structures about the conduit and the diverter in the flow measurement structure, and other constitutions thereof are the same. Note that, constitutions similar to the constitutions described in the above-mentioned embodiment are denoted by the same symbols, and the explanations thereof will be omitted.

As illustrated in FIG. 9 and FIGS. 10A and 10B, a flow measurement structure 61 of the present embodiment is a flow measurement device of diverting type which diverts the target gas at the central section of a conduit 62. A diverter 63 of the present embodiment protrudes from the portion, at which the detection element 12 is disposed in the conduit 62, to the central portion of the conduit 62.

A detection chamber 71, in which the detection element 12 is disposed, is formed at the proximal end section of the diverter 63, an inlet 72 is formed at the upstream side of the distal end section of the diverter 63, and an outlet 73 is formed at the downstream side of the same. Moreover, small tube sections 74, 75 for making the detection chamber 71 and the inlet 72 and outlet 73 respectively communicate with each other are formed at the diverter 63. Moreover, three support members 76, which support the distal end section of the diverter 63, are respectively formed from the distal end section of the diverter 63 to the inner surface of the conduit 62.

In the flow measurement structure 61 having the above-mentioned constitution, the diverter 63 and the support members 76 provide a suitable resistance as resistive elements to the target gas which flows through the conduit 62. With this, a part of the target gas flows into the inlet 72, passes through the detection chamber 71 through the small tube section 74 as the above-mentioned diverted gas, and is discharged from the outlet 73 through the small tube section 75 so as to be merged with the target gas. Therefore, it can be understood that the diverting ratio a:b of the flow rate a of the gas which passes through the portion other than the diverter 63 and the flow rate b of the diverted gas which passes through the diverter 63 is determined by the geometrical shape of the diverter 63.

In the present embodiment, as illustrated in FIGS. 9 and 10A, a swirl generating section (guide section) 80 is disposed upstream of the inlet 72 in the conduit 62 of the flow measurement structure 61. The swirl generating section 80 is intended to generate a flow, which swirls around the axis in the conduit 62, to the target gas.

In the example of the swirl generating section 80 illustrated in FIGS. 9 and 10A, a disc section 81 for introducing the target gas from the peripheral section of the conduit 62 is disposed at the upstream side, and an opening section 82 for discharging the target gas from the central section of the conduit 62 is disposed at the downstream side. Multiple curved plates (eight plates in the shown example) 83 are disposed at the circumference around the axis of the conduit 62 between the disc section 81 and the opening section 82. The curbed plate 83 is getting more inclined toward the axis side of the conduit 62 in the counterclockwise direction viewed from the upstream side.

According to the above-mentioned constitution, at the swirl generating section 80, the target gas is made to flow from the peripheral section of the conduit section 62 toward the central section of the same by the disc section 81 and the opening section 82. At this time, as illustrated in FIG. 10A, by curbed plate 83, the target gas has a flow which swirls in the counterclockwise direction viewed from the upstream side.

Therefore, as illustrated in FIG. 10B, the target gas, which has passed through the swirl generating section 80, is made to flow downstream in the conduit 62 while rotating counter-clockwise viewed from the upstream side. With this, centrifugal force acts on the target gas flowing through the conduit 62 and the dust D. Centrifugal force is proportional to mass so that greater centrifugal force acts on the dust D, whose mass is larger than that of the target gas, in comparison to the centrifugal force which acts on the target gas. Thus, the dust D is made to flow at the peripheral section of the conduit 62. As a result, the dust D is restrained from entering the inlet 72 of the diverter 63 which is disposed at the central section of the conduit 62.

Moreover, centrifugal force is used so that the ratio of the dust D entering the inlet 72 is restrained from changing according to the mounting direction of the flow measurement device 60. Therefore, the mounting direction of the flow measurement device 60 is not limited.

Figure 11:
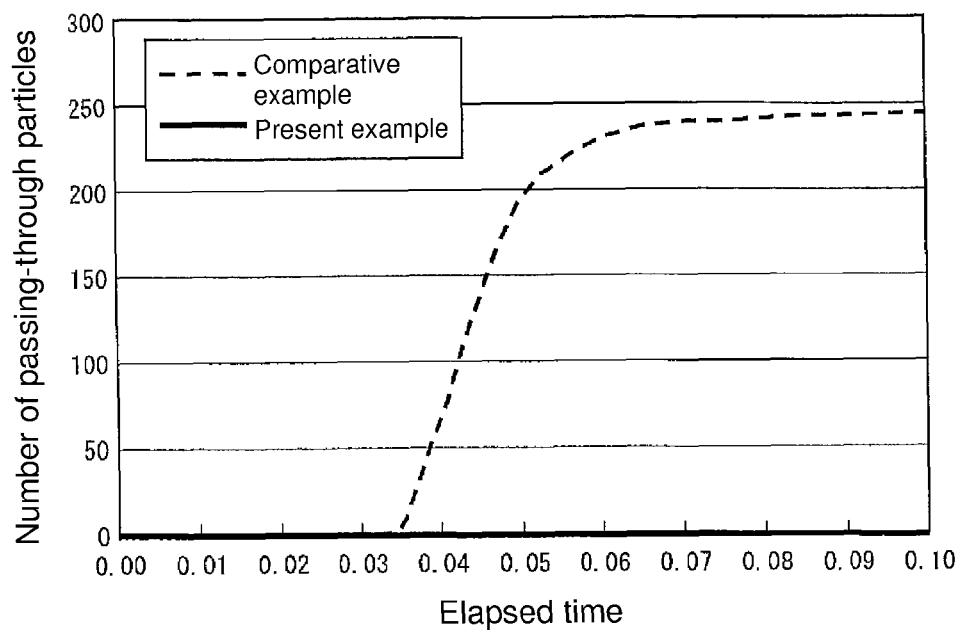
FIG. 11 is a graph illustrating simulation results of the above-mentioned flow measurement device and a flow measurement device as a comparative example.

FIG. 11 illustrates the results which are obtained by simulations of the amount of the dust D entering the diverter 63 by using fluid analysis, similar to the graph of FIG. 5. In FIG. 11, the solid line corresponds to the graph of the flow measurement device 60 of the present embodiment, and the broken line corresponds to the graph of a flow measurement device of a comparative example. The flow measurement device of this comparative example is configured by omitting the swirl generating section 80 from the flow measurement device 60 of the present embodiment.

In this simulation, the amount of the target gas, which enters the conduit 62, is set to 100 liter/min. Moreover, the dust D is defined as a particle which has a diameter of 0.1 μm, and a specific gravity of 3000 kg/m$^3$, and 1000000 particles are made to enter the conduit 62. Note that, it is devised that the diverting ratio a:b of the flow measurement device 60 of the present embodiment and the diverting ratio a:b of the flow measurement device of the comparative example are made to correspond to each other.

In FIG. 11, the horizontal axis denotes the elapsed time, and the vertical axis denotes the number of the above-mentioned particles which pass through the detection chamber 71 in which the detection element 12 is disposed. Referring to FIG. 11, in the flow measurement device 60 of the present embodiment, the number of the above-mentioned particles passing through the detection chamber 33 remains substantially zero, and then, it can be understood that the dust D is sufficiently restrained from entering the diverter 21.

Moreover, in the present embodiment, by virtue of the swirl generating section 80, the target gas at the central section in the conduit 62 is mixed with the target gas at the peripheral section so as to be further stirred so that the flow velocity distribution of the target gas, which has passed through the swirl generating section 80, at the cross section of the conduit 20 can be uniformed. Thus, the above-mentioned diverting ratio becomes constant so that the flow rate of the target gas can be estimated with accuracy.

Figure 12A:
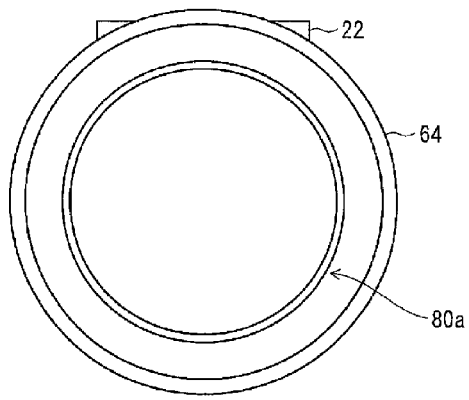
FIGS. 12A and 12B are schematic views illustrating a modified example of the above-mentioned flow measurement device.
Figure 12B:
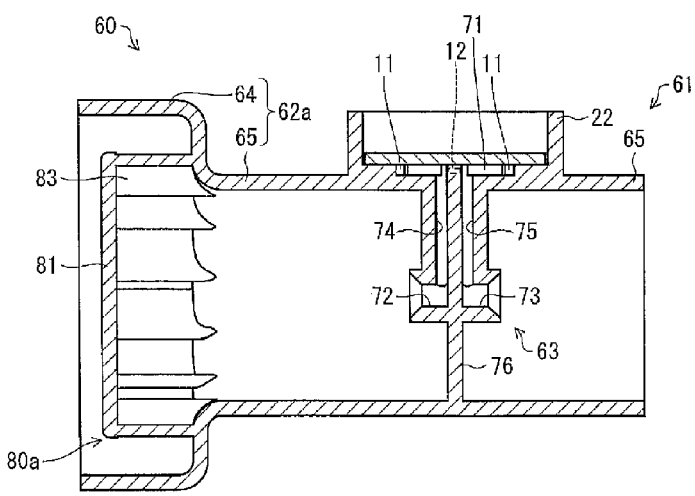

FIGS. 12A and 12B illustrate a modified example of the flow measurement device 60 of the present embodiment. FIG. 12A is a front view, and FIG. 12B is a diagram which is cut along the A-A line of FIG. 2B and is viewed in the arrow direction. Comparing to the flow measurement device 60 illustrated in FIG. 9, the flow measurement device 60 illustrated in FIGS. 12A and 12B has a different structure about the swirl generating section 80 and its placement area of the conduit 62, and other constitutions thereof are the same.

In a conduit 62a illustrated in FIGS. 12A and 12B, a large diameter section 64 having a large inner diameter is formed at the upstream side of a discharge surface where a swirl generating section 80a discharges the target gas, and a small diameter section 65 having a small inner diameter is formed at the downstream side of the above-mentioned discharge surface. Namely, the large diameter section 64 is wider than the small diameter section 65. Moreover, comparing to the swirl generating section 80 illustrated in FIG. 9, the swirl generating section 80a illustrated in FIG. 12 is configured in such a way that the circumference passing the distal end sections of the plurality of curbed plates 83 corresponds to the inner circumference of the small diameter section 65 at the downstream side, and the opening section 82 is omitted. Note that, the inner diameter of the small diameter section 65 is the same as the inner diameter of the conduit 62 which is illustrated in FIG. 9 and FIG. 10A.

By the way, the swirl generating sections 80, 80*a* provide a swirling flow to the target gas so that a pressure loss is made to occur in the target gas which has passed through the swirl generating sections 80, 80*a*. On the other hand, in the conduit 62*a* illustrated in FIGS. 12A and 12B, the small diameter section 65 is narrower than the large diameter section 64 so that the pressure of the fluid, which has been introduced through the large diameter section 64, is made to increase at the small diameter section 65. Thus, the above-mentioned pressure loss can be lowered.

Note that, instead of the swirl generating section 80*a* illustrated in FIGS. 12A and 12B, the swirl generating section 80 illustrated in FIG. 9 may be disposed at any position upstream of the inlet 72. However, the swirl generating section 80*a* illustrated in FIGS. 12A and 12B is disposed at the large diameter section 64 adjacent to the small diameter section 65 so that the opening section 82 can be omitted.

FIGS. 13A and 13B illustrate another modified example of the flow measurement device 60 of the present embodiment. FIG. 13A is a front view, and FIG. 13B is a diagram which is cut along the A-A line of FIG. 2B and is viewed in the arrow direction. Comparing to the flow measurement device 60 illustrated in FIG. 9, the flow measurement device 60 illustrated in FIGS. 13A and 13B has a different structure about the swirl generating section, and other constitutions thereof are the same.

In a swirl generating section 80*b* illustrated in FIGS. 13A and 13B, a shaft section 84 is disposed at the central section of the conduit 62, a plurality of rod-shaped support members 85 for supporting the shaft section 84 are disposed, and curbed plates 86 extend downstream from the respective support members 85. The curbed plate 86 is configured to rotate clockwise viewed from the upstream side in the downstream direction.

In the swirl generating section 80*b* illustrated in FIGS. 13A and 13B, the target gas flows from the central section of the conduit 62 to the peripheral section by the shaft section 84. Then, a flow, which swirls clockwise viewed from the upstream side, is generated by the curbed plates 86.

Therefore, the target gas, which has passed through the swirl generating section 80*b*, is made to flow downstream in the conduit 62 while rotating clockwise viewed from the upstream side. With this, centrifugal force acts on the target gas flowing through the conduit 62 and the dust D. Thus, the dust D is made to flow at the peripheral section of the conduit 62. As a result, the dust D is surely restrained from entering the inlet 72 of the diverter 63 which is disposed at the central section of the conduit 62.

As mentioned above, various structures can be considered for the swirl generating sections 80, 80*a*, 80*b*. Moreover, the direction, in which the target gas is rotated by the swirl generating sections 80, 80*a*, 80*b*, may be counterclockwise or clockwise viewed from the upstream side. Moreover, the number of the curbed plates 83, 86 at the swirl generating sections 80, 80*a*, 80*b* can be one or more, and it is desired that a plurality of the plates are disposed at axially symmetrical positions.

Figure 14A:
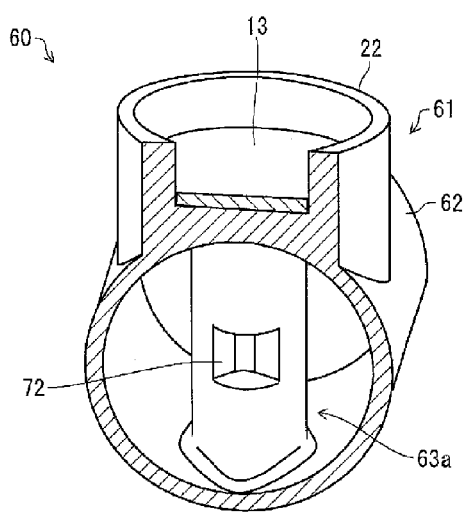
FIGS. 14A and 14B are schematic views illustrating still another modified example of the above-mentioned flow measurement device.
Figure 14B:
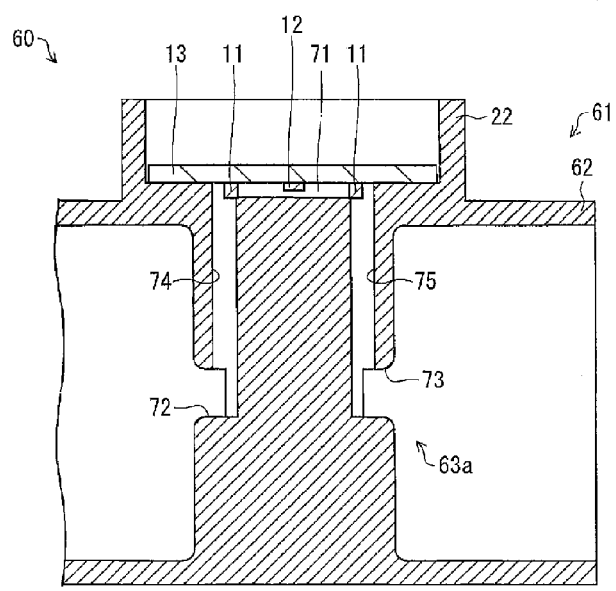

FIGS. 14A and 14B illustrate still another modified example of the flow measurement device 60 of the present embodiment. FIG. 14A is a perspective view of which the upstream side is cut out, and FIG. 14B is a diagram which is cut along the A-A line of FIG. 2B and is viewed in the arrow direction, and illustrates a diverter and its surroundings. Comparing to the flow measurement device 60 illustrated in FIG. 9, the flow measurement device 60 illustrated in FIGS. 14A and 14B has a different structure about the diverter, and other constitutions thereof are the same.

A diverter 63*a* illustrated in FIGS. 14A and 14B extends in the conduit 62 from the portion, in which the detection element 12 is disposed, to the opposite inner surface beyond the central section. Furthermore, comparing to the diverter 63 illustrated in FIG. 9, the support member 76 is omitted, the cross section, which is cut along a vertical surface in the extending direction, is widened, and the space between an inlet 72 and an outlet 73, and the space between a small tube section 74 and a small tube section 75, are widened. Moreover, the shape is tapered toward the upstream side and the down stream side.

Therefore, only the diverter 63*a* illustrated in FIGS. 14A and 14B can provide a suitable resistance as a resistive element to the target gas. Namely, it can be said that the diverter 63*a* illustrated in FIGS. 14A and 14B is configured by integrally forming the diverter 63 and the resistive element illustrated in FIG. 9.

Figure 15A:
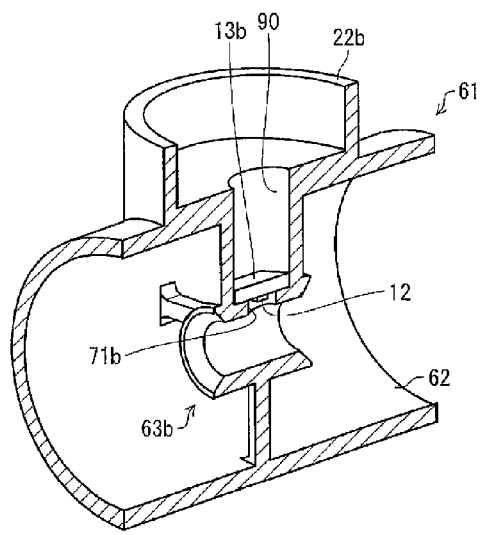
FIGS. 15A and 15B are schematic views illustrating still another modified example of the above-mentioned flow measurement device.
Figure 15B:
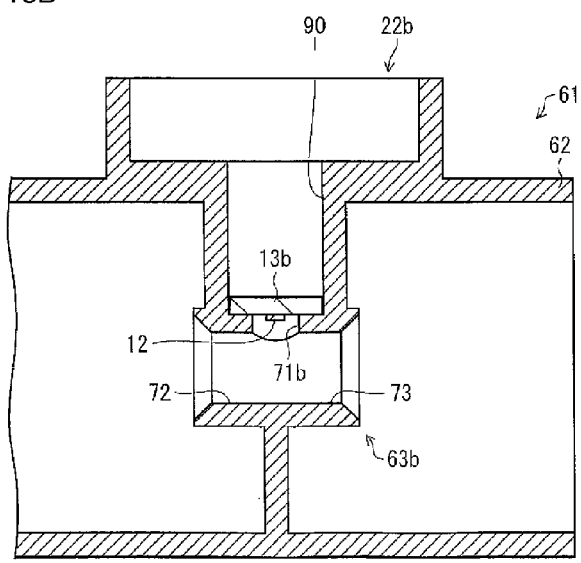

FIGS. 15A and 15B illustrate still another modified example of the flow measurement device 60 of the present embodiment. FIG. 15A is a partially cut out perspective view, and FIG. 14B is a diagram which is cut along the A-A line of FIG. 2B and is viewed in the arrow direction, and illustrates a diverter 63 and its surroundings. Comparing to the flow measurement device 60 illustrated in FIG. 9, the flow measurement device 60 illustrated in FIGS. 15A and 15B has different structures about the diverter and the receiving section, and other constitutions thereof are the same.

A diverter 63*b* illustrated in FIGS. 15A and 15B is disposed at the central section of the conduit 62, and is a cylindrical member which is opened toward the upstream side and the downstream side. Moreover, in a receiving section 22*b* illustrated in FIGS. 15A and 15B, a communicating section 90 is formed so as to communicate from the central section at the bottom surface of the receiving section 22 illustrated in FIG. 9 to a detection chamber 71*b* of the diverter 63*b*. A circuit board 13*b*, in which the detection element 12 is mounted on its lower surface, is disposed on the bottom surface of the communicating section 90. Like this, the present invention can be applied to the flow measurement device 60 of diverting type in which the detection element 12 is disposed at the central section of the conduit 62.

Figure 16A:
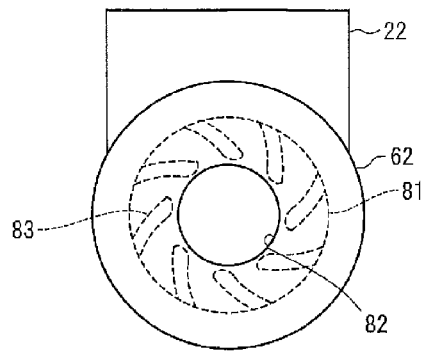
FIGS. 16A and 16B are schematic views illustrating still another modified example of the above-mentioned flow measurement device.
Figure 16B:
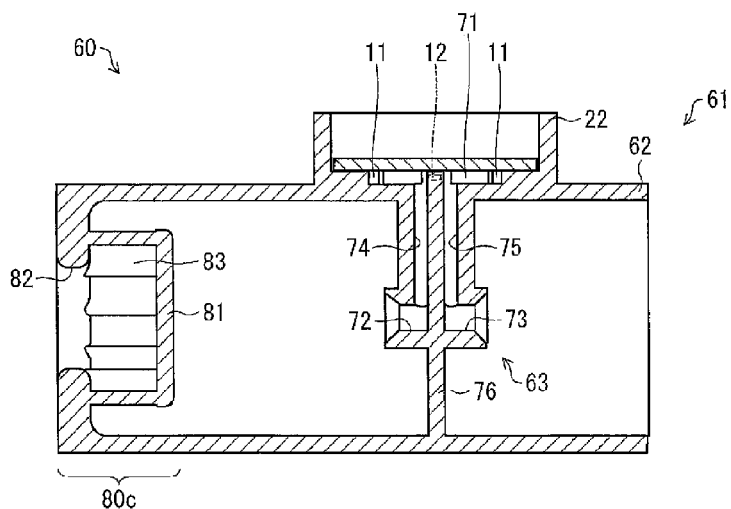
Figure 17A:
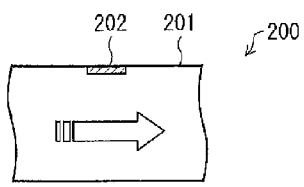
FIGS. 17A, 17B, and 17C are cross-sectional views illustrating basic structures of flow measurement devices of straight tube type and diverting type.
Figure 17B:
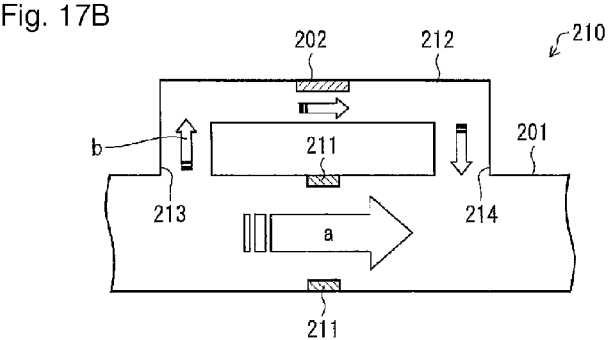
Figure 17C:
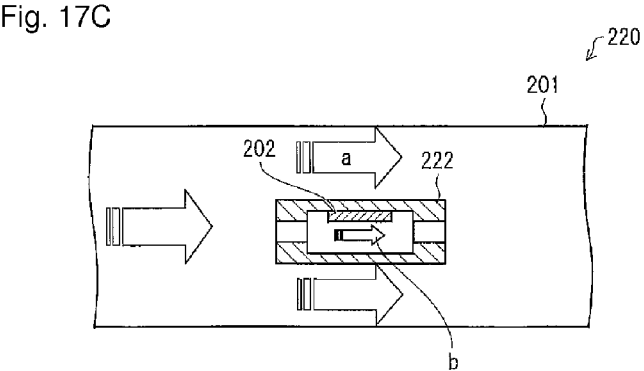

FIGS. 16A and 16B illustrate another modified example of the flow measurement device 60 of the present embodiment. FIG. 16A is a front view, and FIG. 16B is a diagram which is cut along the A-A line of FIG. 2B and is viewed in the arrow direction. Comparing to the flow measurement device 60 illustrated in FIG. 9, the flow measurement device 60 illustrated in FIGS. 16A and 16B has a different structure about the swirl generating section, and other constitutions thereof are the same.

A swirl generating section 80*c* illustrated in FIGS. 16A and 16B is configured by disposing the swirl generating section 80 illustrated in FIG. 9 at a symmetrical position with respect to the opening section 82. Thus, the swirl generating section 80*c* may be configured in such a way that the target gas is introduced from the central section of the conduit 62, and is discharged from the peripheral section of the conduit 62.

Note that, the target gas may flow backward through the conduit 62, the diverter 63, and the detection element 12. Then, the swirl generating sections 80, 80*a* to 80*c* of the present embodiment are added at positions which are symmetrical with respect to the diverter 63, so that the above-mentioned advantageous effects can be obtained even when the target gas flows backward. Namely, the present invention can be applied to a flow measurement device which can measure a flow rate of fluid in two-way directions.

The present invention is not limited to the above-mentioned respective embodiments, but can be variously modified within the scope which is defined by the claims, and an embodiment, which is obtained by suitably combining the technical means disclosed in the different embodiments respectively, is also covered by the technical scope of the present invention.

For example, although the shape of the vertical cross section in the direction from the upstream side to the downstream side in the conduits 20, 62 is desired to be circumferential as is true with the above-mentioned embodiments, this can be any shape, such as a rectangle.

As mentioned above, the flow measurement structure according to the present invention includes a conduit through which fluid to be measured flows; and a diverter which diverts the fluid flowing through the conduit, and guides the diverted fluid to a detection element for measuring a flow rate of the fluid, and is, in order to solve the above-mentioned problems, characterized in that an inlet of the diverter is disposed at one of a central section and a peripheral section in the conduit, and the conduit includes, upstream of the inlet, a guide section which guides the fluid to the other of the central section and the peripheral section.

According to the above-mentioned constitution, the guide section of the conduit is disposed upstream of the inlet of the diverter. Then, when the inlet is disposed at the peripheral section in the conduit, the guide section guides the fluid toward the central section in the conduit. With this, the dust flowing in the conduit is guided toward the central section by the guide section so as to be restrained from entering the diverter from the inlet which is disposed at the peripheral section.

On the other hand, when the inlet is disposed at the central section, the guide section guides the fluid toward the peripheral section. With this, the dust flowing in the conduit is guided toward the peripheral section by the guide section so as to be restrained from entering the diverter from the inlet which is disposed at the central section.

In the flow measurement structure according to the present invention, when the inlet of the diverter is disposed at the peripheral section in the conduit, and the guide section is disposed upstream of the inlet so as to guide the fluid toward the central section, the guide section may be configured in such a way that an inclined section, in which the inner diameter of the conduit is getting narrower from the upstream side to the downstream side, is formed at least in the vicinity of the inlet.

The dust, which is flowing near the upstream side of the inlet, easily enters the inlet. Thus, according to the above-mentioned constitution, the dust, which easily enters the inlet, is guided by the inclined section disposed near the upstream side of the inlet so that the dust is restrained from entering the diverter through the inlet.

Note that, the inclined section may be formed over the entire circumference in the conduit. In this case, the cross sectional area in the conduit is narrowed by the inclined section so as to increase the flow velocity of the fluid so that the dust can be quickly moved apart from the inlet. As a result, the dust can be surely restrained from entering the diverter through the inlet. Moreover, the fluid at the peripheral section is mixed with the fluid at the central section by the inclined section so that the flow velocity distribution in the conduit can be uniformed. As a result, the flow rate of the fluid can be estimated with accuracy.

The flow measurement structure according to the present invention is further provided, at the conduit, and downstream of the inlet, with a resistive element which provides a suitable resistance to the fluid, and the resistive element is preferably opened at the central section in the conduit. In this case, the dust gathering to the central section can be promptly moved downstream through the opening of the resistive element. As a result, the dust is surely restrained from entering the diverter through the inlet.

In the flow measurement structure according to the present invention, the inlet of the diverter is disposed at the central section in the conduit, and when the guide section is disposed upstream of the inlet so as to guide the fluid toward the peripheral section, it is preferred that the guide section include a structure which generates a flow, which swirls within the conduit, in the fluid.

In this case, due to the swirling flow, centrifugal force, which is directed from the central section in the conduit toward the peripheral section, is made to act on the fluid. Thus, the dust flowing in the conduit is made to move by the centrifugal force toward the peripheral section so that the dust can be restrained from entering the diverter through the inlet which is disposed at the central section. Moreover, the fluid is made to be stirred by the guide section so that the flow velocity distribution in the conduit can be uniformed. As a result, the flow rate of the fluid can be estimated with accuracy.

By the way, the guide section generates the swirling flow so that pressure loss is allowed to occur in the fluid which has passed through the guide section. Then, in the flow measurement structure according to the present invention, the conduit may be widened upstream of the inlet. In this case, the conduit is narrowed before the inlet so that the fluid, which has been introduced into the conduit, is raised in pressure before the inlet, thereby decreasing the pressure loss.

In the flow measurement structure according to the present invention, the conduit and the diverter may be configured in such a way that the fluid flows backward, and the conduit may be further provided with a guide section for the case in which the fluid flows backward. In this case, the structure makes it possible to measure a flow rate of fluid in two-way directions.

Note that, a flow measurement device for measuring a flow rate of fluid to be measured can provide advantageous effects similar to the above-mentioned advantageous effects as long as the flow measurement device is provided with the flow measurement structure having the above-mentioned constitution, and the detection element, which is disposed at the diverter of the flow measurement structure, for measuring the flow rate.

INDUSTRIAL APPLICABILITY

As mentioned above, according to the present invention, the dust flowing in the conduit is guided toward a position which is apart from the position of the inlet by the guide section of the conduit which is disposed upstream of the inlet of the diverter so that the dust is restrained from entering the diverter through the inlet, and hence, the present invention can be applied to any flow measurement device which is a diverting type.

DESCRIPTION OF SYMBOLS

1 flow measurement device
10 flow measurement structure 11 seal member
12 detection element
13, 13b circuit board
14 cover
20 conduit
21 diverter
22, 22b receiving section
30, 52 resistive element
31 inlet
32 outlet
33 detection chamber
34, 35 small tube section
50, 51, 55 inclined section (guide section)
53 central section
54 peripheral section
56 guide section
60 flow measurement device
61 flow measurement structure
62, 62a conduit
63, 63a, 63b diverter
64 large diameter section
65 small diameter section
72 inlet
73 outlet
76 support member
71, 71b detection chamber
74, 75 small tube section
80, 80a to 80c swirl generating section (guide section)
81 disc section
82 opening section
83, 86 curbed plate
84 shaft section
85 support member
90 communicating section
D dust

The invention claimed is:

1. A flow measurement structure comprising: a conduit through which fluid to be measured flows; and a diverter which diverts the fluid flowing through the conduit, and guides the diverted fluid to a detection element for measuring a flow rate of the fluid,
wherein an inlet of the diverter is disposed at a peripheral section in the conduit,
the conduit includes, upstream of the inlet, a guide section which guides the fluid to a central section in the conduit,
the guide section is configured by forming an inclined section, where a diameter in the conduit becomes smaller from an upstream side toward a downstream side, at least in the vicinity of the upstream of the inlet, and
in a longitudinal section perpendicular to a central axis of the conduit, a distance between the central axis and the inlet is greater than a distance between the central axis and a distal end of the inclined section at the downstream side.

2. The flow measurement structure according to claim 1, further comprising a resistive element, which provides a suitable resistance to the fluid, downstream of the inlet in the conduit,
wherein the resistive element is opened at the central section in the conduit.

3. The flow measurement structure according to claim 1, wherein the fluid can flow backward in the conduit and the diverter,
wherein the conduit further includes a guide section for a case in which the fluid flows backward.

4. A flow measurement device for measuring a flow rate of fluid to be measured, comprising:
the flow measurement structure according to claim 1; and
the detection element disposed at the diverter of the flow measurement structure so as to measure the flow rate.

5. The flow measurement structure according to claim 2, wherein the fluid can flow backward in the conduit and the diverter,
wherein the conduit further includes a guide section for a case in which the fluid flows backward.

* * * * *